J. A. HARD.
Sleeve-Buttons.

No. 155,612.

Patented Oct. 6, 1874.

WITNESSES.
J. L. Durand
C. L. Evert

INVENTOR
Josiah A. Hard
Alexander Mator
By
Attorneys.

UNITED STATES PATENT OFFICE.

JOSIAH A. HARD, OF LAWRENCE, KANSAS.

IMPROVEMENT IN SLEEVE-BUTTONS.

Specification forming part of Letters Patent No. 155,612, dated October 6, 1874; application filed January 23, 1874.

*To all whom it may concern:*

Be it known that I, JOSIAH A. HARD, of Lawrence, in the county of Douglas and in the State of Kansas, have invented certain new and useful Improvements in Sleeve-Buttons; and do hereby declare that the following is a full, clear, and exact description thereof, reference being had to the accompanying drawings, and to the letters of reference marked thereon, making a part of this specification.

The nature of my invention consists in providing a button having a shank and two disks with a ball-and-socket joint, so that one of the disks may be tipped nearly perpendicular in one way, and can be turned around on the shaft or shank, as will be hereinafter more fully set forth.

Figure 1:
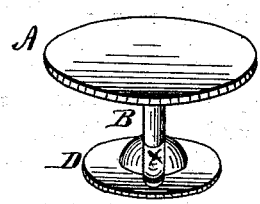
Figure 2:
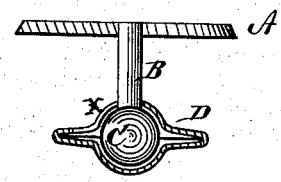
Figure 3:
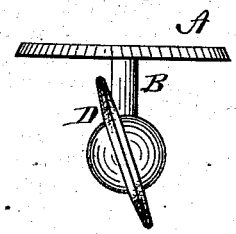

In the accompanying drawing, Figure 1 is a perspective view of a button embodying my invention. Fig. 2 is a section of the same; and Fig. 3 is a side view, showing one of the disks turned to one side.

A represents one disk of a button, provided with a central shank, B, projecting on one side thereof, and the shank at its outer end formed with a ball, C. D represents the other disk of the button, provided with a suitable socket for the reception of the ball C.

This disk D may be made of two pieces of equal size, with half of the socket in each piece; or the ball C on the end of the shank or shaft B may be held in the socket by a small flange soldered, riveted, or screwed to the inside of the disk after the ball end is inserted.

The button may be made of metal, rubber, ivory, lava, or any other suitable material; and my invention may be applied to sleeve or collar buttons, or, in fact, to any button having a shank and two disks.

The inside flange or half of the disk D is slotted, as shown at $x$, Figs. 1 and 2, so as to allow the disk to be tipped nearly perpendicular in one way, and can be turned around on the shaft. The ball and socket are on the inside disk of the sleeve-button, to allow an easy adjustment within the button-hole, by rotating and tilting the inner disk so as to bring it on a line nearly parallel with the plane of the shank. In a button thus constructed the outer disk is allowed to freely rotate without disturbing, or becoming disengaged from, the inner disk.

Having thus fully described my invention, what I claim as new, and desire to secure by Letters Patent, is—

As an article of manufacture, the within-described sleeve-button, consisting of the outer disk A, shank B, having a ball, C, on its end, and the inner disk D, provided with a slotted circular recess, all as shown and described.

In testimony that I claim the foregoing I have hereunto set my hand this 3d day of January, 1874.

JOSIAH A. HARD.

Witnesses:
  C. L. EVERT,
  ARTHUR N. MARR.